United States Patent [19]
Nakajima

[11] Patent Number: 5,847,410
[45] Date of Patent: Dec. 8, 1998

[54] SEMICONDUCTOR ELECTRO-OPTICAL DEVICE

[75] Inventor: Setsuo Nakajima, Kanagawa, Japan

[73] Assignee: Semiconductor Energy Laboratory Co., Kanagawa-ken, Japan

[21] Appl. No.: 756,172

[22] Filed: Nov. 25, 1996

[30] Foreign Application Priority Data

Nov. 24, 1995 [JP] Japan .................................. 7-329762

[51] Int. Cl.⁶ ................................................ H01L 31/112
[52] U.S. Cl. ................................ 257/59; 257/72; 257/749
[58] Field of Search ................................ 257/59, 72, 749

[56] References Cited

U.S. PATENT DOCUMENTS 4,336,295  6/1982  Smith ........................................ 428/195
4,940,495  7/1990  Weber et al. ............................. 257/749
5,397,920  3/1995  Tran ......................................... 257/749
5,548,425  8/1996  Adachi et al. ............................. 359/69
5,576,556  11/1996  Takemura et al. ........................ 257/66

Primary Examiner—David B. Hardy
Attorney, Agent, or Firm—Fish & Richardson P.C.

[57] ABSTRACT

A display device comprising a pixel portion having a thin film transistor using silicon as a semiconductor layer and a pixel electrode connected to the thin film transistor, wherein: said pixel electrode having a first transparent electrically conductive film electrically connected to said semiconductor layer and a second transparent electrically conductive film disposed on the first transparent electrically conductive film; said first transparent electrically conductive film comprises an oxide layer of a first metal having an oxidation potential lower than that of silicon; and said second transparent electrically conductive film comprises an oxide layer of a second metal having an oxidation potential higher than that of silicon. Also claimed is a process for fabricating the display device.

10 Claims, 13 Drawing Sheets

5,847,410

SEMICONDUCTOR ELECTRO-OPTICAL DEVICE

BACKGROUND OF THE INVENTION

The present invention relates to a display device using a transparent electrically conductive film for the electrode of the display portion of a liquid crystal display device and the like. More particularly, the present invention is directed to obtain a display device having excellent reliability by ameliorating the electrode structure.

Conventionally, there are known a plasma display device and a liquid crystal display device, etc. as a display device using a transparent electrically conductive film for the display portion. The display is realized in those display devices by utilizing the characteristics of an electro-optical material such as a liquid crystal material, and by controlling the electric voltage or current to change the optical characteristics thereof such as light-transmitting properties, reflectance or scattering properties, etc.

In an active matrix type liquid crystal display device, row lines and column lines are formed on a first substrate by means of multilayered interconnection technology, and a pixel electrode made up of a transparent electrically conductive film is provided to each of the crossing portions of the lines. Furthermore, an active element such as a thin film transistor (TFT) is connected to the pixel electrode. On the other hand, a facing electrode made up of a transparent electrically conductive film is provided on a second substrate. The first substrate and the second substrate are positioned in such a manner that the pixel electrode and the facing electrode are opposed to each other, and a liquid crystal material is sealed between the substrates.

When an electric voltage or current, etc., is applied between an arbitrarily selected row line of the first substrate and an arbitrary column line of the second substrate, the electric potential or the electric current at the pixel electrode on the crossing portion of the lines can be controlled to selectively change the light-transmitting properties, reflectance or scattering properties, etc., to thereby enable a matrix display. On the other hand, in case of a plasma display device, a gas which emits light by the plasma generated by an applied high electric field is sealed between a first substrate and a second substrate. Thus, display is realized by generating a gas plasma.

At any rate, the display portion is required to possess light transmitting properties. Thus, a transparent electrically conductive film is used for the pixel electrode. In general, ITO (indium tin oxide) containing indium oxide as principal component is used for the transparent electrically conductive film, and the pixel electrode is structured such that the ITO film is brought into direct contact with the semiconductor layer of the TFT. The semiconductor layers of the TFT are made up of silicon (amorphous silicon or polycrystalline silicon).

FIG. 6 is a diagram showing the state of the oxidation potential of metals used in the electrodes and wirings of TFTs. Referring to FIG. 6, the oxidation potential of silicon is lower than that of indium. Thus, at the interface between silicon and ITO at high temperatures, the oxidation-reduction equilibrium proceeds to the direction of reducing indium while oxidizing silicon. As a result, silicon oxide, which is an insulator, is generated at the interface with the result that display failure due to the increase in contact resistance occurs.

Transparent electrically conductive films having low resistance other than ITO include tin oxide and zinc oxide. Referring to FIG. 6, however, it can be seen that both metal oxides are low in oxidation potential as compared with that of silicon. Thus, similar to the case of ITO, oxidation reduction phenomenon which oxidizes silicon occurs when heated.

Further, although titanium oxide is known as a transparent electrically conductive film having an oxidation potential lower than that of silicon, its resistance is too high to use it as a pixel electrode.

In the fabrication steps of TFT, in general, a heat treatment under gaseous hydrogen, i.e., a so-called hydrogenation treatment is performed in the final step. The electric characteristics of TFT, particularly the off current characteristics, can be improved by this treatment that compensates the defects that are present in silicon semiconductor layer. To obtain off current characteristics favorable for a TFT that is connected to a pixel electrode, a heat treatment is preferably effected in a temperature range of from 300° to 400° C.

However, when a heat treatment is performed in the aforementioned temperature range, as described above, the contact resistance increases between the semiconductor layer comprising silicon and the pixel electrode comprising ITO, tin oxide, etc. Thus, the hydrogenation treatment cannot be performed at a sufficiently high temperature, thereby being not capable of sufficiently improving the off current characteristics of a TFT in the pixel portion. A TFT in the pixel portion having a high off current signifies that the retention of an image data cannot be assured. This leads to a loss of reliability of the display device.

Conventionally, as a method for preventing oxidation of silicon, there is employed a method in which a pad made up of titanium nitride, titanium, etc., is formed on the contact portion to provide a barrier layer. However, to form a pad, various steps such as depositing a film of the pad material, resist patterning, and etching are necessary, resulting in increasing the number of steps. Furthermore, the aperture ratio of the pixel portion is decreased by providing a pad.

SUMMARY OF THE INVENTION

An object of the present invention is, accordingly, to overcome the aforementioned problems, and to provide, without increasing the number of steps, a display device comprising a pixel electrode which has a low contact resistance with silicon and capable of being heat treated at high temperatures.

To solve the above-mentioned object, according to one aspect of the present invention, there is provided a display device comprising a pixel portion having a thin film transistor using silicon as a semiconductor layer and a pixel electrode connected to the thin film transistor, wherein:

said pixel electrode comprises a first transparent electrically conductive film electrically connected to said semiconductor layer and a second transparent electrically conductive film disposed on the first transparent electrically conductive film;

said first transparent electrically conductive film comprises an oxide layer of a first metal having an oxidation potential lower than that of silicon; and said second transparent electrically conductive film comprises an oxide layer of a second metal having an oxidation potential higher than that of silicon.

According to another aspect of the present invention, there is provided a display device comprising a pixel portion having a thin film transistor using silicon as a semiconductor layer and a pixel electrode connected to the thin film transistor, wherein:

said pixel electrode comprises a first transparent electrically conductive film electrically connected to said semiconductor layer and a second transparent electrically conductive film disposed on the first transparent electrically conductive film;

said first transparent electrically conductive film comprises an oxide layer obtained by oxidizing by heat treatment a first metal having an oxidation potential lower than that of silicon; and said second transparent electrically conductive film comprises an oxide layer of a second metal having an oxidation potential higher than that of silicon.

Further according to still another aspect of the present invention, there is provided a process for fabricating a display device comprising the steps of:

fabricating a thin film transistor using silicon as the semiconductor layer; and forming a pixel electrode electrically connected to the semiconductor layer of said thin film transistor, wherein:

said step of forming the pixel electrode further comprises the steps of:

forming a first transparent electrically conductive film layer comprising an oxide layer of a first metal having an oxidation potential lower than that of silicon so as to be brought into electrically contact with said semiconductor layer; and forming a second transparent electrically conductive film layer comprising an oxide layer of a second metal having an oxidation potential higher than that of silicon on the surface of the oxide layer of said first metal.

According to yet another aspect of the present invention, there is provided a process for fabricating a display device comprising the steps of:

fabricating a thin film transistor using silicon as the semiconductor layer; and forming a pixel electrode electrically connected to the semiconductor layer of said thin film transistor, wherein:

said step of forming the pixel electrode further comprises the steps of:

forming a metallic layer having an oxidation potential lower than that of silicon so as to be brought into electrically contact with said semiconductor layer;

forming a transparent electrically conductive film layer comprising an oxide layer of a metal having an oxidation potential higher than that of silicon on the surface of the metallic layer; and making the metallic layer transparent by a heat treatment.

DETAILED DESCRIPTION OF THE INVENTION

Figure 1:
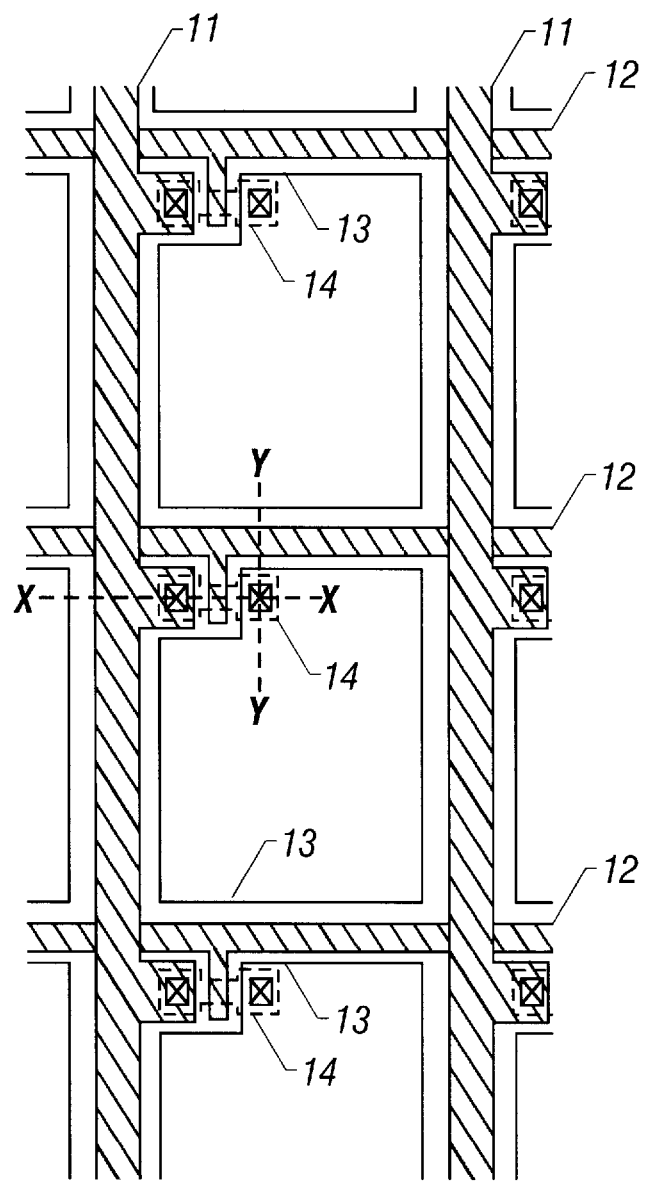
FIG. 1 is a top view showing a pixel portion of an active matrix type liquid crystal display device according to Examples 1 and 2 of the present invention.
Figure 2A:
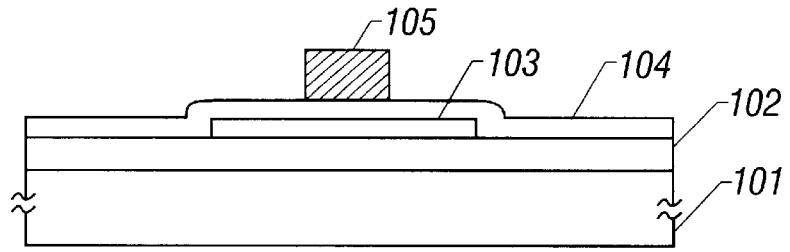
FIGS. 2 (A) to 2 (F) are cross sectional views showing each step of the fabrication of a pixel TFT according to Example 1 of the present invention, which is taken along dotted lines X–X' of FIG. 1.
Figure 2B:
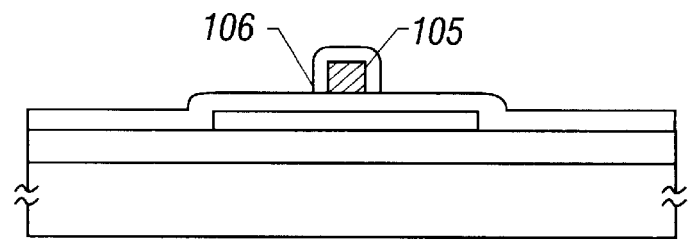
Figure 2C:
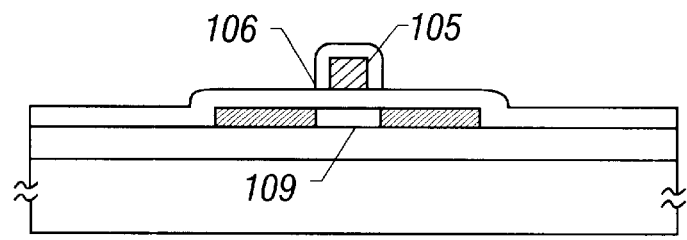
Figure 2D:
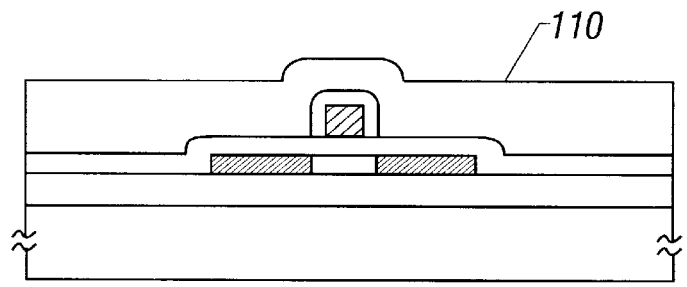
Figure 2E:
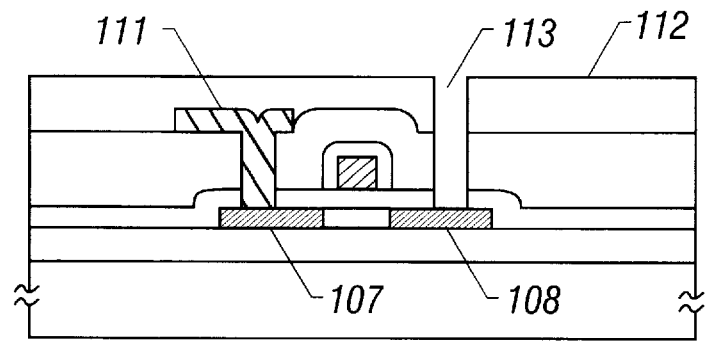
Figure 2F:
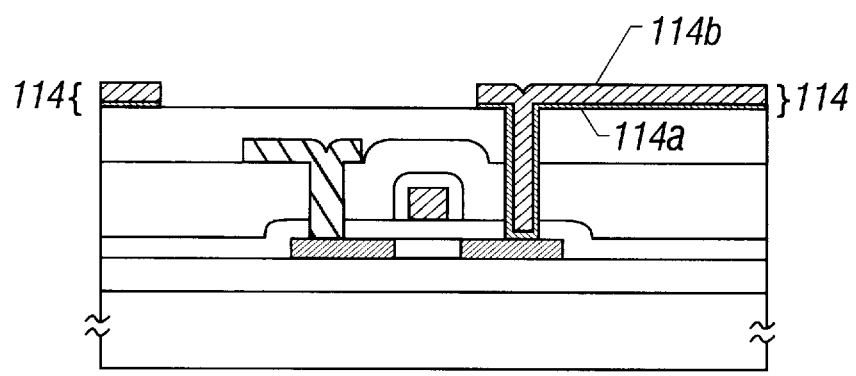
Figure 3A:
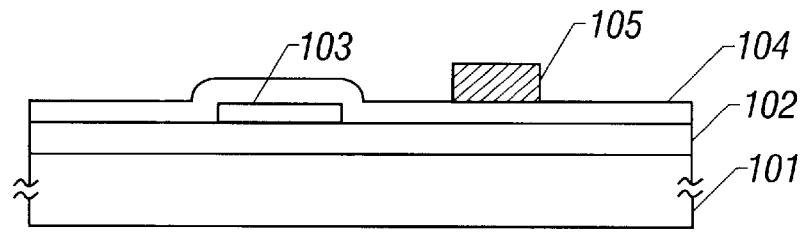
FIGS. 3 (A) to 3 (F) are cross sectional views showing each step of the fabrication of a pixel TFT according to Example 1 of the present invention, which is taken along dotted lines Y–Y' of FIG. 1.
Figure 3B:
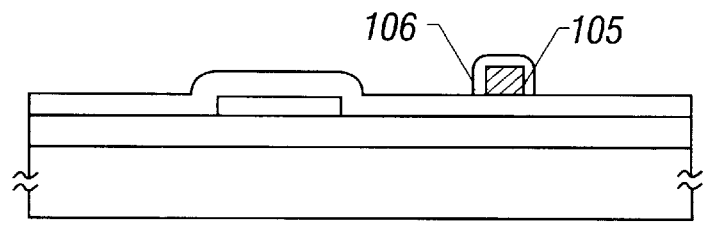
Figure 3C:
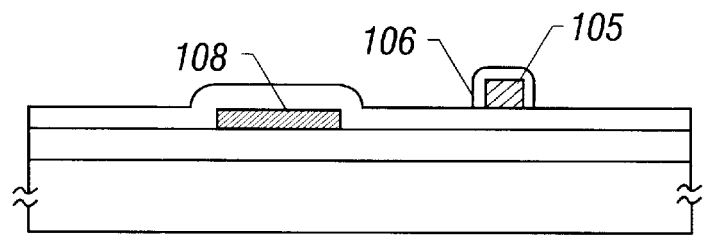
Figure 3D:
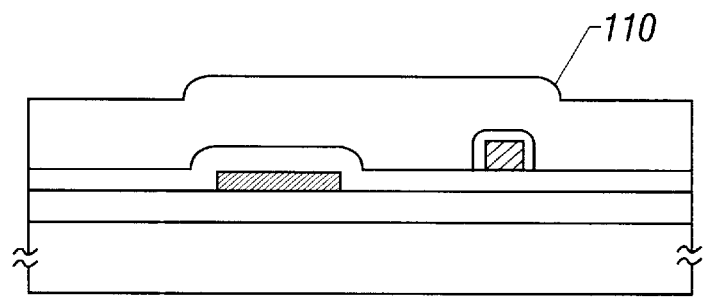
Figure 3E:
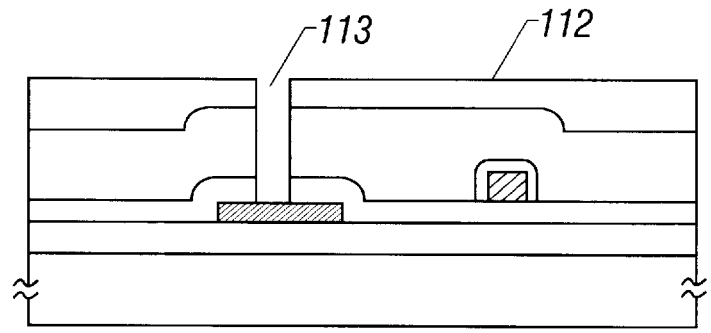
Figure 3F:
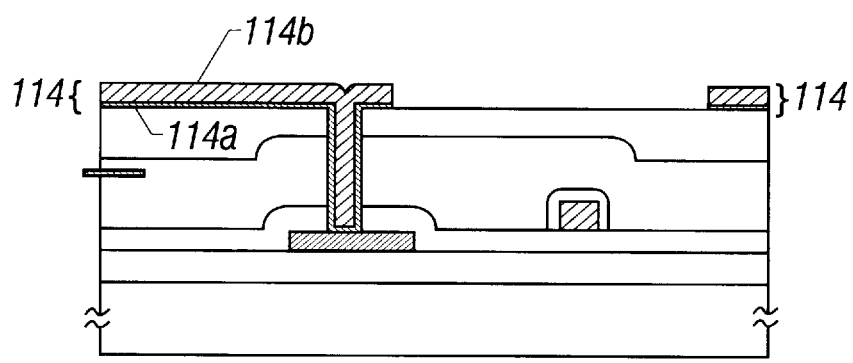
Figure 4A:
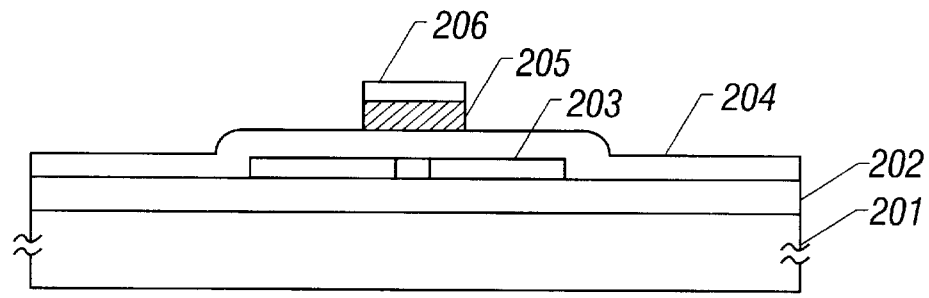
FIGS. 4 (A) to 4 (G) are cross sectional views showing each step of the fabrication of a pixel TFT according to Example 2 of the present invention, which is taken along dotted lines X–X' of FIG. 1.
Figure 4B:
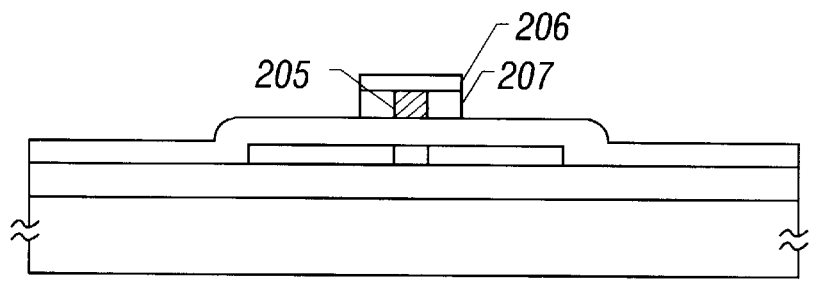
Figure 4C:
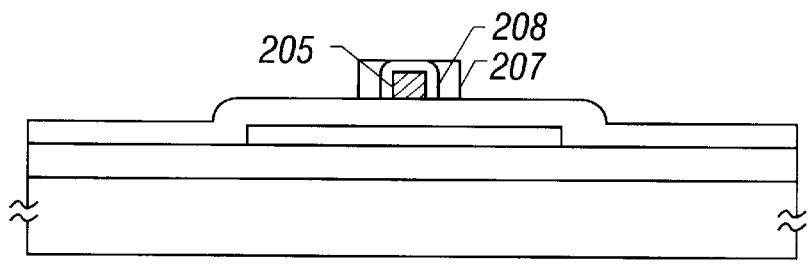
Figure 4D:
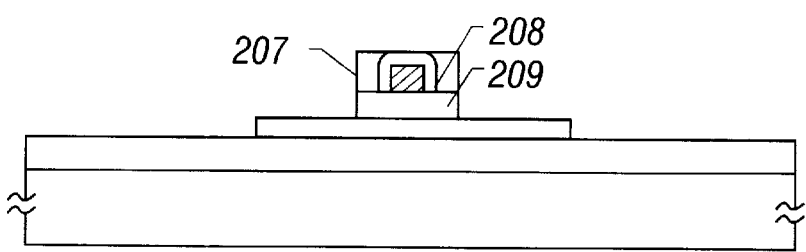
Figure 4E:
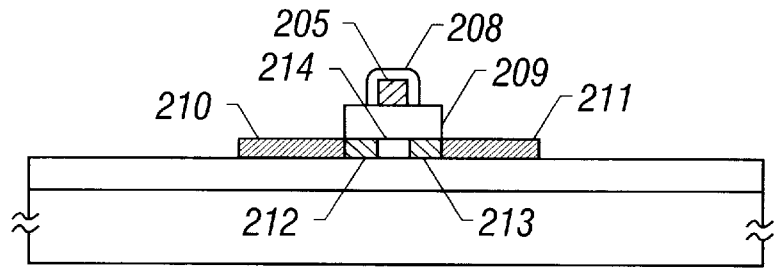
Figure 4F:
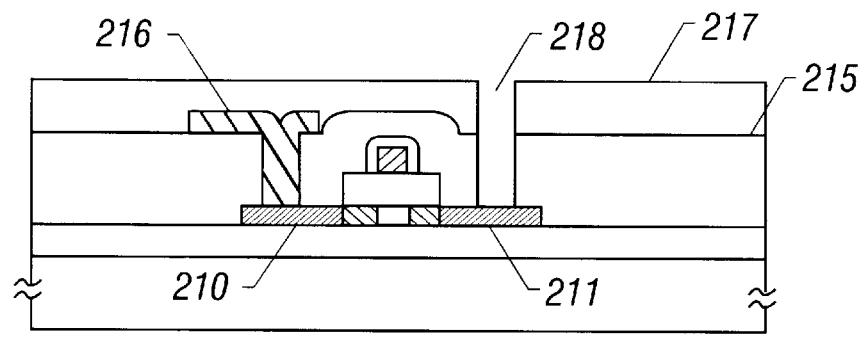
Figure 4G:
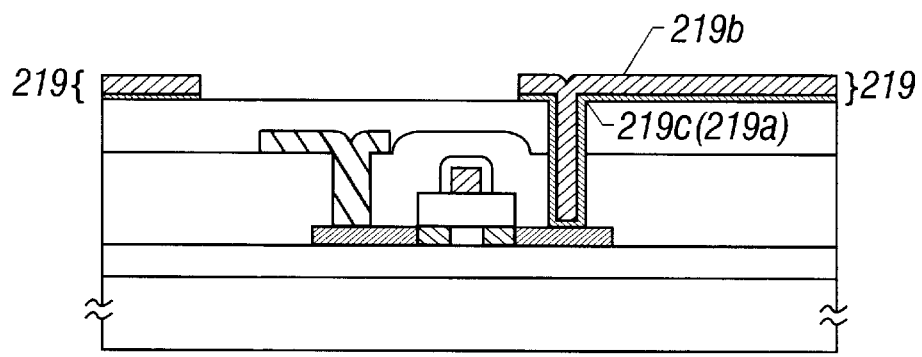
Figure 5A:
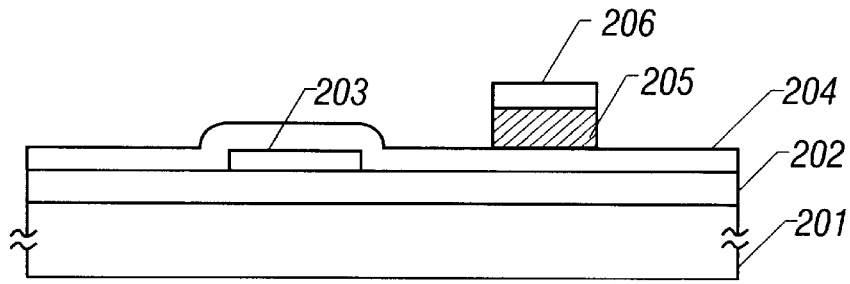
FIGS. 5 (A) to 5 (G) are cross sectional views showing each step of the fabrication of a pixel TFT according to Example 2 of the present invention, which is taken along dotted lines Y–Y' of FIG. 1.
Figure 5B:
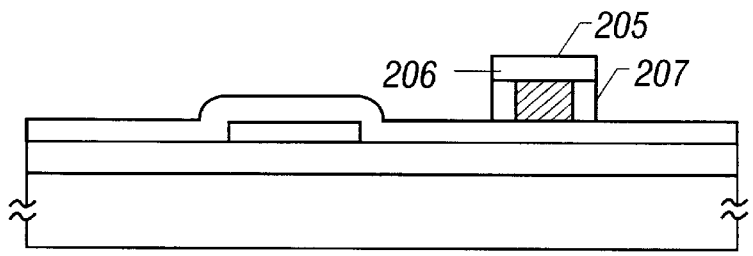
Figure 5C:
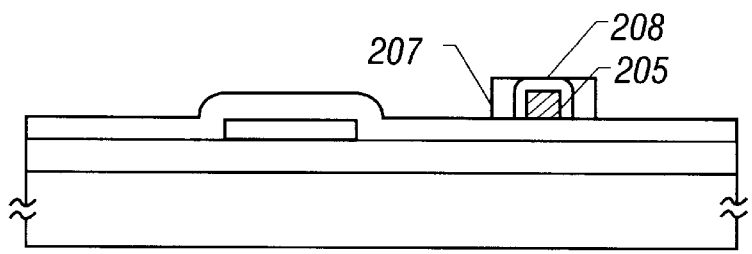
Figure 5D:
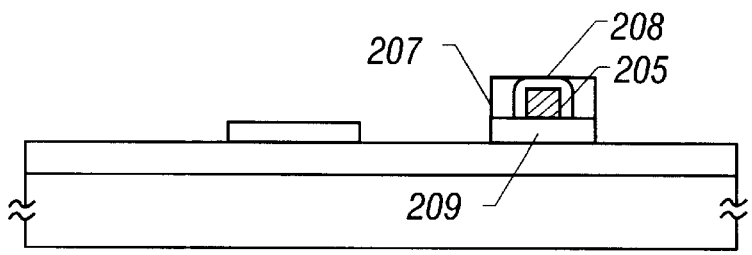
Figure 5E:
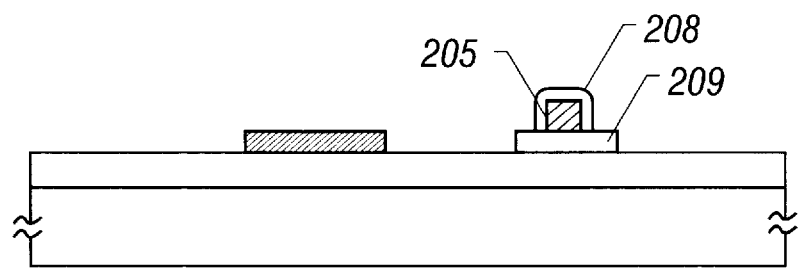
Figure 5F:
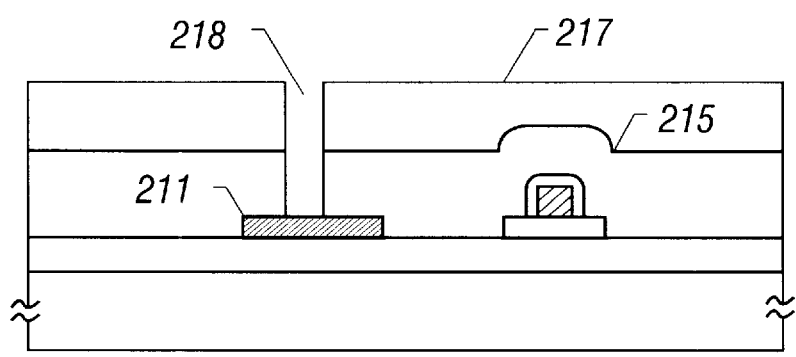
Figure 5G:
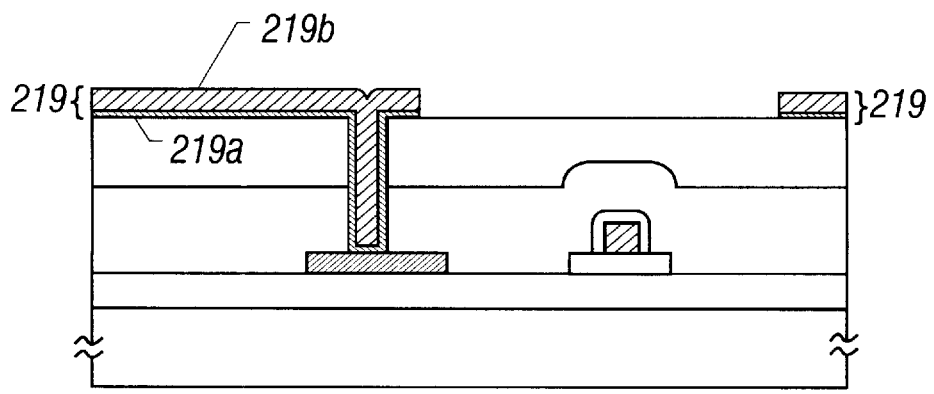

In a basic constitution of a display device according to the present invention, there are provided an electric wiring, a TFT for switching, and a pixel electrode connected to the TFT on a transparent substrate. In addition to this basic constitution, an electrode provided opposed to the pixel electrode and a liquid crystal material or other type of an electro-optical material are requisite to complete a display device.

Referring to FIGS. 2 and 3, an embodiment of the present invention is described below.

Silicon is used for a semiconductor layer 103 of a TFT, and a pixel electrode 114 is electrically connected to the silicon layer 103. The pixel electrode 114, which is double-layered, comprises transparent electrically conductive films 114a and 114b, in which the first transparent electrically conductive film 114a which is brought into contact with silicon comprises an oxide of a metal having an oxidation potential lower than that of silicon, and the second transparent electrically conductive film 114b formed on the metal oxide comprises an oxide layer of a second metal having an oxidation potential higher than that of silicon.

In the above constitution, the metal oxide which is brought into contact with silicon at the interface between the pixel electrode and the silicon layer is thermally stabilized, because the oxidation potential of the metal oxide is lower than that of silicon and the second transparent electrically conductive film. Thus, the contact resistance can be prevented from increasing because the interface between silicon and the pixel electrode remains without being oxidized by a heat treatment such as hydrogenation treatment.

Figure 6:
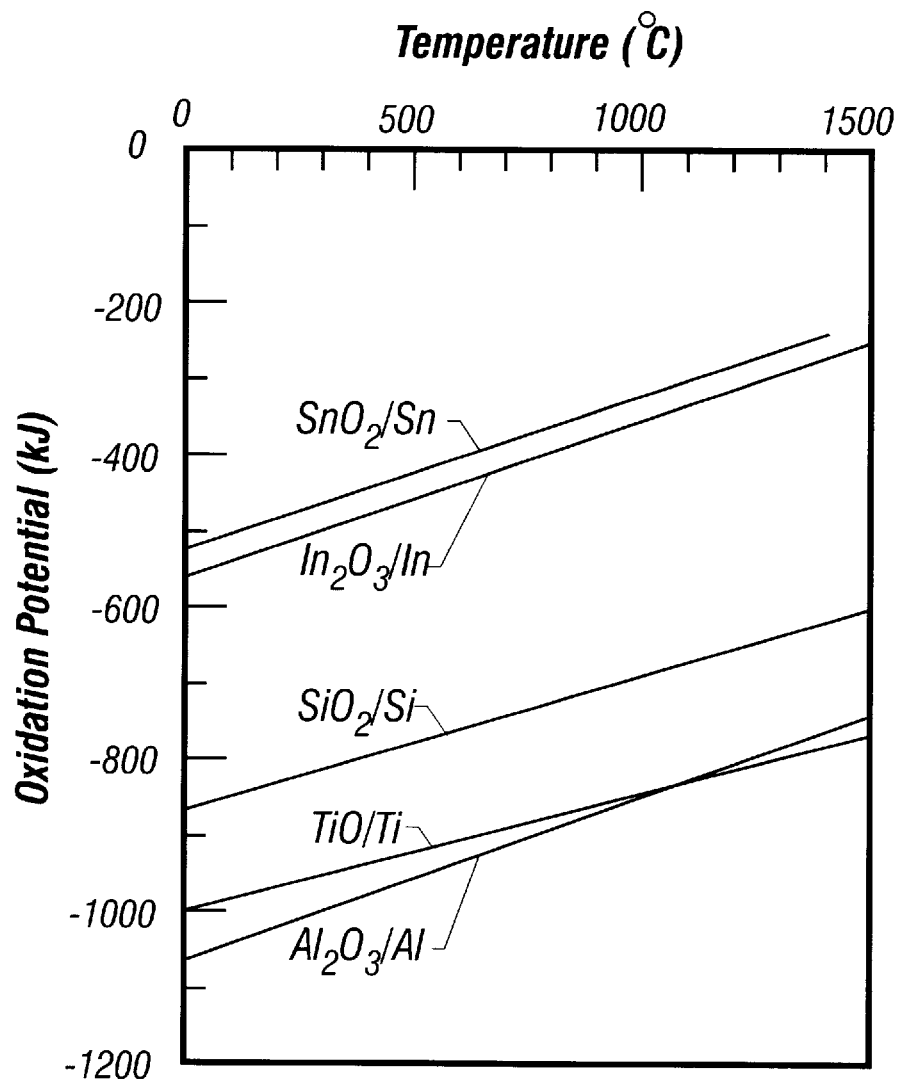
FIG. 6 is a diagram showing a state of oxidation potential of the metals used in the electrode of the TFTs.

For instance, it can be seen from a diagram of FIG. 6 showing a state of oxidation potential of the metals that titanium oxide can be used for the first transparent electrically conductive film which is brought into contact with silicon. For the second transparent electrically conductive film, a widely used ITO film can be employed. Because a thin film of titanium oxide is transparent and is electrically conductive, it need not be patterned into a conventional padlike shape, but it can be shaped to the same one as that of the pixel electrode.

The pixel electrode having the structure above can be formed by two methods described below.

Thus, adoptable is a first fabrication process comprising forming a first transparent electrically conductive film layer comprising a first metal oxide layer having an oxidation potential lower than that of silicon so as to be brought into electrically contact with the semiconductor layer comprising silicon; and then forming, on the surface of the first metal oxide film, a second transparent electrically conductive film layer comprising a second metal oxide having an oxidation potential higher than that of silicon.

In FIGS. 2 (F) and 3 (F), the embodiment of the first fabrication process is shown.

In the fabrication step of a pixel electrode, the ITO film 114b is formed after forming the titanium oxide film 114a, and patterning is performed thereafter to form the pixel electrode 114.

Also adoptable is a second fabrication process comprising forming a metallic layer having an oxidation potential lower than that of silicon so as to be brought into electrically contact with the semiconductor layer of the TFT; then forming, on the surface of the metallic film, a transparent electrically conductive film layer comprising a metal oxide having an oxidation potential higher than that of silicon; and then rendering the metallic layer transparent by applying a heat treatment.

In FIGS. 4 (F) and 5 (G) are shown the embodiment of the second fabrication process.

A titanium film 219a is formed as a metallic layer having an oxidation potential lower than that of silicon, and an ITO film 219b is formed thereafter to provide a metal oxide having an oxidation potential higher than that of silicon. By finally heating the resulting structure, the titanium film 219a is modified by oxidation into a transparent and electrically conductive titanium oxide film 219c. As a result, a pixel electrode 219 comprises a double layer of titanium oxide film 219c and an ITO film.

In the heating step above, titanium alone can be oxidized without forming silicon oxide at the interface between titanium and silicon, because the oxidation potential of titanium is lower than silicon. Accordingly, the contact resistance between silicon and pixel electrode can be prevented from being increased. The annealing of silicon constituting the semiconductor layer can be effected simultaneously with the step for rendering the metallic electrode transparent by performing the heat treatment step in a hydrogen atmosphere.

To evaluate the pixel electrode obtained by the present invention, the present inventors measured the contact resistance between the pixel electrode and silicon, as well as the transmittance of the titanium/ITO layered film.

Figure 7:
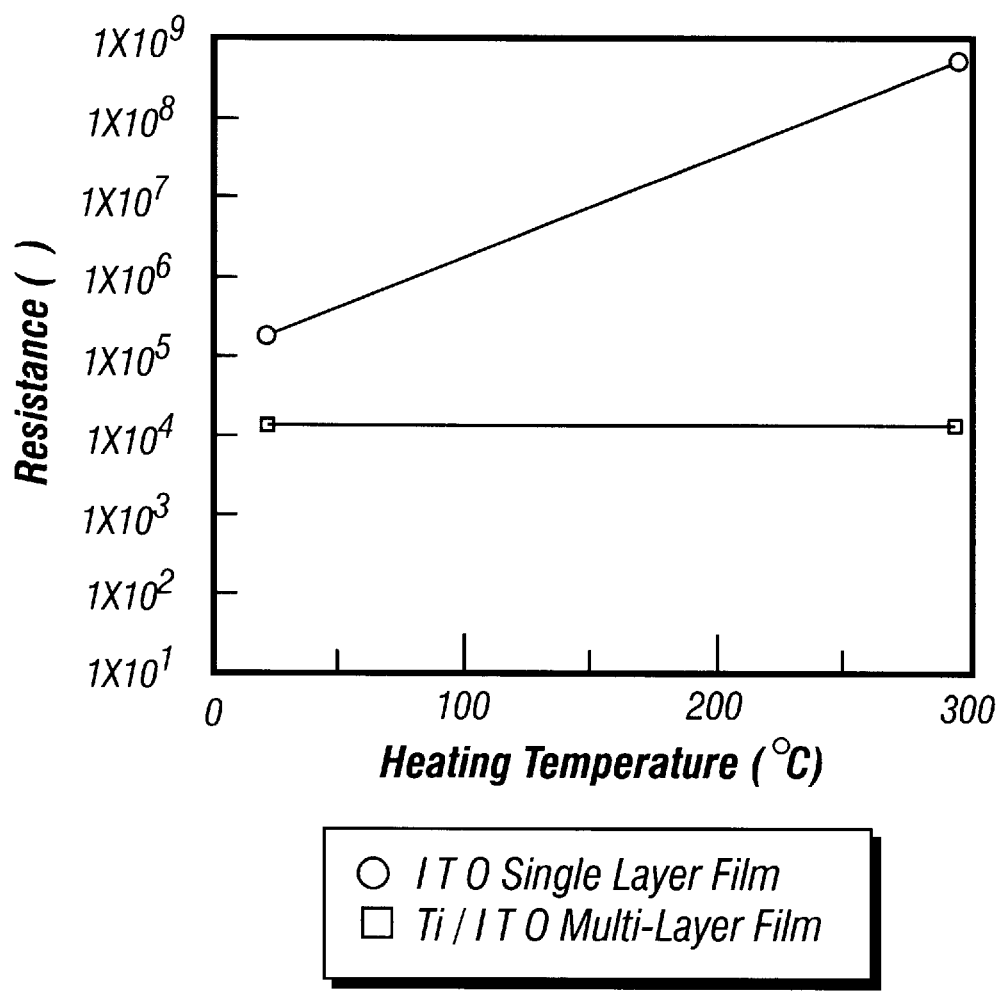
FIG. 7 is a graph showing the change of contact resistance between a pixel electrode and silicon with increasing heating temperature.

FIG. 7 is a graph showing the change in contact resistance between the pixel electrode and polycrystalline silicon with increasing temperature of heat treatment. The resistance of a contact chain consisting of 40 pixel electrodes comprising a conventional single layer film of ITO 1,200 Å in thickness, and of a contact chain of 40 pixel electrodes comprising a double-layered film according to the present invention consisting of a 50 Å thick titanium film and a 1,200 Å thick ITO film are measured, respectively. The heating temperature was set at room temperature (without heat treatment) and at 300° C. (under hydrogen atmosphere).

Referring to FIG. 7, the contact resistance of the pixel electrode comprising a single layer film of ITO increases by heat treatment. In contrast to this, the contact resistance of a pixel electrode comprising a titanium/ITO double-layered film before heating remains approximately the same even after heating. This indicates that titanium functions as a stopper for the oxidation of silicon.

Figure 8:
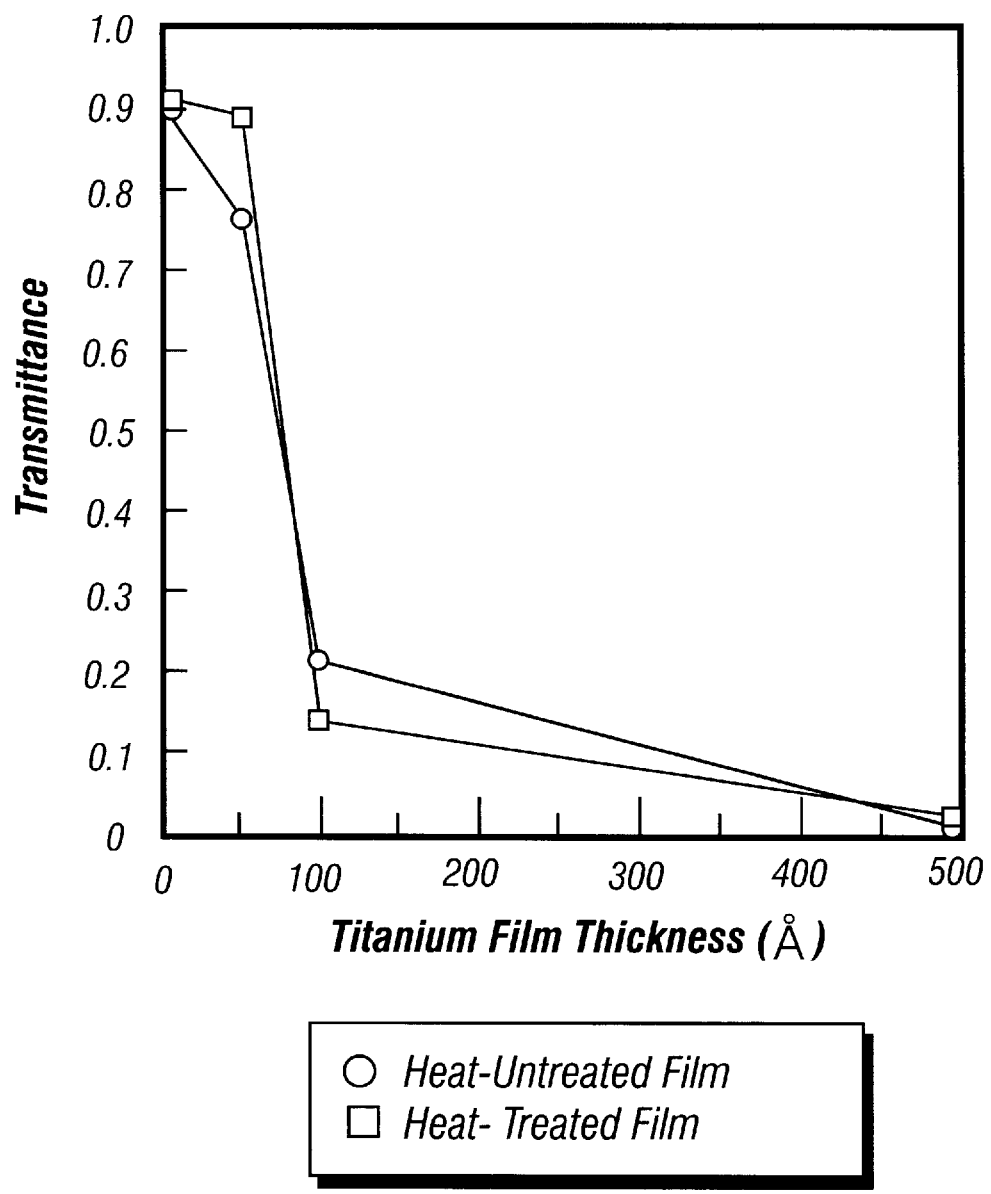
FIG. 8 is a graph showing the change of transmittance of a titanium/ITO double-layered pixel electrode with increasing thickness of titanium film.
Figure 9A:
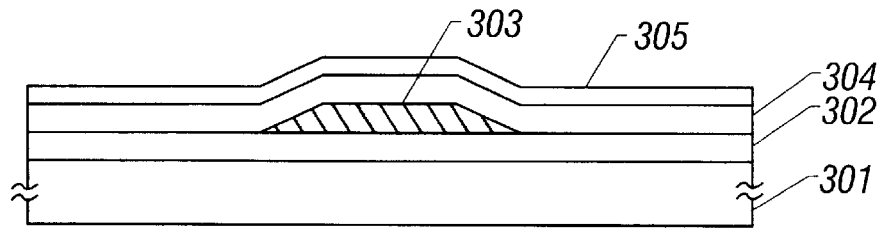
FIGS. 9(A) to 9(D) are cross sectional views showing each step of the fabrication of a pixel TFT according to Example 3.
Figure 9B:
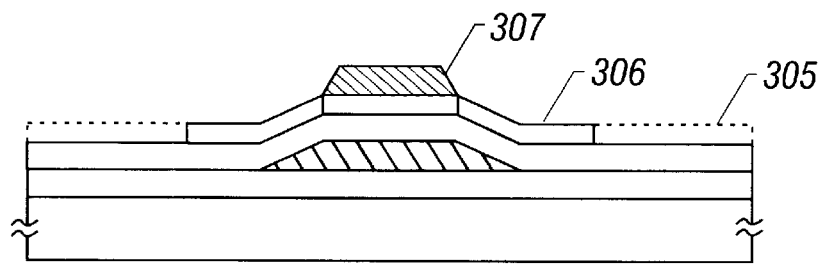
Figure 9C:
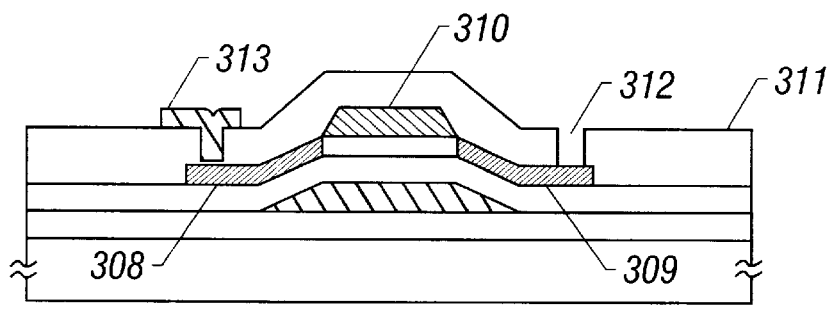
Figure 9D:
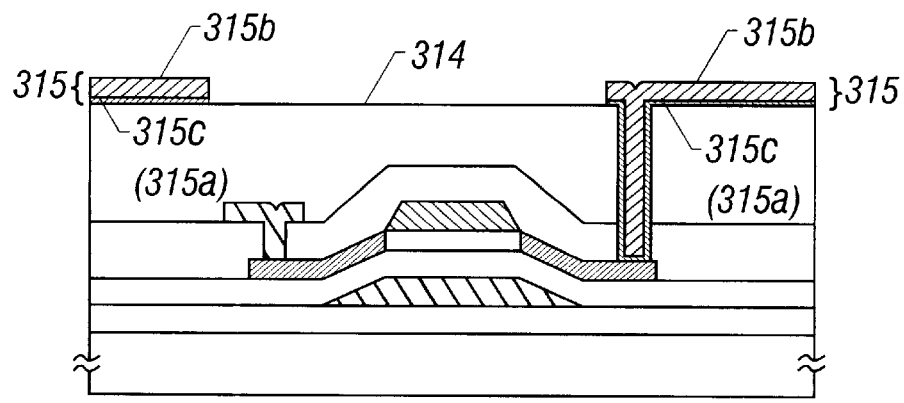

FIG. 8 is a graph showing the change of transmittance of a titanium/ITO double-layered pixel electrode with increasing thickness of titanium film. Measured results are given for the pixel electrode subjected to hydrogenation treatment at 300° C. and for the untreated pixel electrode. It should be noted that the film thickness of ITO is 1,200 Å, and the transmittance is obtained for a light 500 nm in wavelength.

As is seen from FIG. 8, a transmittance suitable for display cannot be obtained for both untreated and treated pixel electrodes if the film thickness of titanium exceeds 100 Å. In case titanium is provided at a thickness of about 50 Å in the titanium/ITO double-layered pixel electrode, the transmittance of the pixel electrode increases by subjecting it to a heat treatment at 300° C. to such an extent as to enable a transmittance approximately comparable to that of a single layered film of ITO. This signifies that titanium is oxidized into a more transparent titanium oxide. Thus, to obtain a pixel electrode feasible for displays, titanium is provided at a thickness of 100 Å or less, and preferably, at a thickness of about 50 Å.

EXAMPLE

FIG. 1 shows a top view of a pixel portion of an active matrix type liquid crystal display device according to Examples 1 and 2 of the present invention. Referring to FIG. 1, gate signal lines 11 and image signal lines 12 are provided on a substrate in a lattice-like arrangement, and a pixel electrode 13 comprising a transparent electrically conductive film is arranged on a lattice formed by an image signal line 12 and another image signal line. The gate signal line 11, the image signal line 12, and the pixel electrode 13 are electrically insulated from each other by an insulating film not shown in the figure. Furthermore, a TFT is formed to control the voltage to be applied to the pixel electrode 13. In an active layer 14 of the TFT, the channel crosses the gate signal line 11 via an insulating film not shown in the figure, a source is electrically connected with the image signal line 12, and a drain is electrically connected with the pixel electrode.

The fabrication process for a pixel portion shown in FIG. 1 is described in detail by referring to Examples 1 and 2 below.

Example 1

The present example shows a case of applying the present invention to a pixel TFT of an active matrix-type liquid crystal display device. FIGS. 2 (A) to 2 (F) and FIGS. 3 (A) to 3 (F) are cross sectional views showing each step of the fabrication process of a pixel TFT according to Example 1 of the present invention, and FIGS. 2 (A) to 2 (F) are cross sectional views taken in parallel with the longitudinal direction of the channel of the pixel TFT along dotted line X–X' of FIG. 1. FIGS. 3 (A) to 3 (F) are cross sectional views taken perpendicular to the longitudinal direction of the channel of the pixel TFT along dotted line Y–Y' of FIG. 1. FIGS. 3 (A) to 3 (F) show the same stages of the corresponding FIGS. 2 (A) to 2 (F), respectively.

Referring to FIG. 2 (A) and FIG. 3 (A), a silicon oxide film was formed by sputtering as a base film 102 on a glass (Corning 1737 or Corning 7059) substrate 101 at a thickness of from 1,000 to 5,000 Å, for example, at a thickness of 2,000 Å.

Subsequently, an amorphous silicon film was deposited by plasma CVD to a thickness of from 100 to 1,500 Å. In this case, the film was formed at a thickness of 800 Å. The thus formed amorphous silicon film was crystallized by a crystallization method such as heating, laser irradiation, etc., and was then patterned to form an active layer 103.

Furthermore, a silicon oxide film from 1,000 to 1,500 Å in thickness was formed by plasma CVD to provide a gate insulating film 104.

A 4,000 Å thick aluminum film was deposited thereafter by sputtering, and was patterned to form a gate electrode 105. The gate electrode 105 corresponds to the gate signal line 12 shown in FIG. 1. Hillocks and whiskers can be prevented from generating in the later heating step by previously incorporating scandium into aluminum at a concentration of about 0.2% by weight (FIG. 2 (A) and FIG. 3 (A)).

Referring to FIG. 2 (B) and 3 (B), the gate electrode 105 was covered by an anodic oxide 106 at a thickness of from 1,500 to 2,000 Å by means of the anodic oxidation technique disclosed in Japanese Unexamined Patent Application No. Hei 5-267667. In the present example, anodic oxidation was effected by applying voltage to the gate electrode 105 utilized as an anode in an electrolytic solution comprising an ethylene glycol solution containing 3% of tartaric acid being neutralized to yield a pH value of 6.9 by using ammonia water. As a result, a dense and stiff anodic oxide 106 was formed around the gate electrode 105. The offset length depends on the film thickness of the anodic oxide 106. The film thickness of the anodic oxide 106 can be controlled by the voltage applied to the gate electrode 105.

Referring to FIG. 2 (C) and FIG. 3 (C), impurity is implanted by ion doping into the active layer 103 while using the gate electrode 105 as a mask. In the present example, phosphorus was implanted to form a P-channel type TFT. Thus, phosphine ($PH_3$) was used as the doping gas. As a result, a source region 107, a drain region 108, and a channel region 109 are formed in the active layer 103, respectively, in a self-alignment manner. After the doping process, the doped phosphorus ions were activated by means of thermal annealing, laser annealing, or the like.

In the present example, an offset region was formed in the layer located lower to the anodic oxide 106, because the anodic oxide 106 was formed around the gate electrode 105, and the source regions 107 and the drain region 107 are offset from the edge plane of the gate electrode by a length corresponding to the to the thickness of the anodic oxide 106. The offset region functions as a high resistance region, thereby being capable of reducing the off current.

Referring to FIG. 2 (D) and FIG. 3 (D), a 6,000 Å thick silicon oxide film was formed by plasma CVD as a first interlayer insulating film 110. It should be noted that a single-layered film of silicon nitride or a multi-layered film comprising silicon oxide film and silicon nitride film can be used as the first interlayer insulating film 110 in place of the single-layered silicon oxide film.

Referring to FIG. 2 (E) and FIG. 3 (E), the first interlayer insulating film 110 comprising a silicon oxide film and the gate insulating film 104 were etched by means of a known photoresist process to form contact holes for the source region 107 and the drain region 108. An aluminum film was formed on only the contact hole on the source region 107 side, and was patterned to form an upper layer wiring/electrode 111. The upper layer wiring/electrode 111 corresponds to the image signal line 12 shown in FIG. 1.

Subsequently, a 2,000 Å thick silicon nitride film, which functions as a passivation film, was formed by means of plasma CVD as a second interlayer insulating film 112. Then, the second interlayer insulating film 112 was etched to complete a contact hole 113 for the drain region 108.

It should be noted that a film of a resin such as polyimide resin, acrylic resin, etc., may be used as the second interlayer insulating film 112. In such a case, the surface of the second interlayer insulating film 112 can be easily planarized by employing a coating method such as spin coating in forming the resin film. Further, because a resin film is a material having a low dielectric constant, the capacity formed between the wiring/electrode on the interlayer insulating film, and the element can be minimized.

Referring to FIG. 2 (F) and FIG. 3 (F), a pixel electrode 114 was formed on the contact hole 113 provided to the drain region 108. The pixel electrode 114 corresponds to the pixel electrode 13 shown in FIG. 1. First, by means of sputtering or a reactive sputtering, a titanium oxide film 114*a* was formed at a thickness of several tens to 100 Å, more specifically, at 50 Å in this example, and an ITO film 114*b* was formed at a thickness of 1,200 Å. The titanium oxide film 114*a* and the ITO film 114*b* were each patterned to the same shape to form a pixel electrode 114. Preferably, the titanium oxide film 114a and the ITO film 114*b* are formed sequentially by a continuous process.

Finally, heat treatment was performed at 300° C. in a hydrogen atmosphere. In the present example, the silicon provided in contact with the pixel electrode 114 can be prevented from being oxidized during heating, because the titanium oxide film 114*a* having an oxidation potential lower than that of silicon and indium oxide, i.e., the principal component of the ITO film 114*b*, was formed at the interface of the drain region 108. Thus, the electric properties of the TFT, the off current characteristics in particular, can be sufficiently improved.

Example 2

The present example shows a case of applying the present invention to a pixel TFT of an active matrix-type liquid crystal display device. FIGS. 4 (A) to 4 (G) and FIGS. 5 (A) to 5 (G) are cross sectional views showing each step of the fabrication process of a pixel TFT according to Example 1 of the present invention, and FIGS. 4 (A) to 4 (G) are each taken in parallel with the longitudinal direction of the channel of the pixel TFT along dotted lines X–X' of FIG. 1. FIGS. 5 (A) to 5 (G) are each taken perpendicular to the longitudinal direction of the channel of the pixel TFT along dotted lines Y–Y' of FIG. 1. FIGS. 5 (A) to 5 (G) each show the same stages of the corresponding FIGS. 4 (A) to 4 (G).

Referring to FIG. 4 (A) and FIG. 5 (A), a silicon oxide film was formed by a sputtering method as a base film 202 on a glass (Corning 1737 or Corning 7059) substrate 201 at a thickness of from 1,000 to 5,000 Å, for example, at a thickness of 2,000 Å.

Subsequently, an amorphous silicon film was formed by means of plasma CVD to a thickness of from 100 to 1,500 Å. In this example, the film was formed at a thickness of 800 Å. The thus formed amorphous silicon film was crystallized by a crystallization method such as heating, laser irradiation, etc., and was then patterned to form an active layer 203. Furthermore, a silicon oxide film 1,000 Å in thickness was formed by means of plasma CVD to provide a gate insulating film 204.

Next, a 5,000 Å thick aluminum film was formed by a sputtering method to provide a gate electrode 205. Hillocks and whiskers can be prevented from generating in the later heating step by previously incorporating scandium into aluminum at a concentration of about 0.2% by weight.

Subsequently, the surface of the aluminum film was anodically oxidized to form a dense anodic oxide 208 (not shown) very thinly on the aluminum film. A mask 206 of a resist was formed thereafter on the surface of the aluminum film. In such a case, the resist mask 206 can be formed in tight contact with the aluminum film because, although not shown in the figure, a dense anodic oxide 208 is formed on the surface of the aluminum film. A gate electrode 205 was formed by etching the aluminum film while using the resist mask 206. The gate electrode 205 corresponds to the gate signal line 11 shown in FIG. 1.

Referring to FIG. 4 (B) and FIG. 5 (B), the gate electrode 205 was anodically oxidized to form a porous anodic oxide 207 at a thickness of 4,000 Å while leaving out the resist mask 206. Because a resist mask 206 was provided in close contact with the surface of the gate electrode 205, the porous anodic oxide 207 was formed only on the side plane of the gate electrode 205.

Next, referring to FIG. 4 (C) and FIG. 5 (C), after stripping off the resist mask 206, the gate electrode 205 was anodically oxidized again in an electrolytic solution to form a dense anodic oxide 208 at a thickness of 1,000 Å.

Different types of anodic oxide can be obtained by simply changing the electrolytic solution. More specifically, the porous anodic oxide 207 can be formed by using an acidic solution containing from 3 to 20% of citric acid, oxalic acid, chromic acid, or sulfuric acid. On the other hand, the dense anodic oxide 208 can be formed by using an electrolytic solution comprising an ethylene glycol solution containing from 3 to 10% of tartaric acid, boric acid, or nitric acid and whose pH is controlled to a value around 7.

Referring to FIG. 4 (D) and FIG. 5 (D), a gate insulating film 209 was formed by etching the silicon oxide film 204 while using the gate electrode 205 and the porous anodic oxide 207 formed around the gate electrode, as well as the dense anodic oxide 208, as the masks.

Referring to FIG. 4 (E) and FIG. 5 (E), the porous anodic oxide 207 was removed. Impurity was then implanted into the active layer 203 by means of ion doping while using the gate electrode 205, the dense anodic oxide 208, and the gate insulating film 209 as masks. In the present example, phosphorus ions were implanted to form a P-channel type TFT by using phosphine ($PH_3$) as the doping gas. In performing the doping, conditions such as the dose and the accelerating voltage were controlled in such a manner that the gate insulating film 209 may function as a semi-permeable mask.

As a result of doping, phosphorus ions were implanted at a high concentration into the region uncovered by the gate insulating film 209 to form a source region 210 and a drain region 211. Phosphorus ions were incorporated at a low concentration into the region covered by the gate insulating film 209 alone. Thus were formed regions 212 and 213 containing impurities at a low concentration (regions lightly doped with impurity). A channel region 214 was formed at the region just below the gate electrode 205 because no impurity was implanted into this region. After the doping step, the doped phosphorus ions were activated by means of thermal annealing, laser annealing, or the like.

The regions 212 and 213 containing impurities at a low concentration contribute to the lowering of off current, because they function as high resistance regions. In particular, the region 213 containing impurities at a low concentration located in the drain region 211 side is called as LDD (lightly doped drain). By providing the dense anodic oxide 208 sufficiently thick, an offset region can be formed from the region just below the dense anodic oxide 208 to further minimize the off current.

Referring to FIG. 4 (F) and FIG. 5 (F), a 5,000 Å thick silicon oxide film was deposited by means of plasma CVD as a first interlayer insulating film 215. It should be noted that a single-layered film of silicon nitride or a multi-layered film comprising silicon oxide film and silicon nitride film can be used as the first interlayer insulating film 215 in place of the single-layered silicon oxide film.

Next, the first interlayer insulating film 215 was etched by a known etching method to form contact holes for each of the source region 210 and the drain region 211.

A 4,000 Å thick aluminum film was formed by means of sputtering on only the contact hole on the source region 210 side, and was etched to form an upper layer wiring/electrode 216. The upper layer wiring/electrode 216 corresponds to the image signal line 12 shown in FIG. 1.

Furthermore, a 2,000 Å thick silicon nitride film was formed by means of plasma CVD as a second interlayer insulating film 217. Then, the second interlayer insulating film 217 was etched to complete a contact hole 218 for the drain region 211.

It should be noted that a film of a resin may be used as the second interlayer insulating film 217 in place of silicon nitride film.

Referring to FIG. 4 (G) and FIG. 5 (G), a pixel electrode 219 was formed on the contact hole 218 provided to the drain region 211. The pixel electrode 219 corresponds to the pixel electrode 13 shown in FIG. 1.

To form the pixel electrode, a titanium film 219a was formed at first by means of sputtering at a thickness of several tens to 100 Å, for example, at a thickness of 50 ÅA in this example, and an ITO film 219b was formed at a thickness of 1,200 Å. The titanium film 219a and the ITO film 219b were each patterned to the same shape of the pixel electrode 13 shown in FIG. 1. Preferably, the titanium film 219a and the ITO film 219b are formed sequentially by a continuous process Finally, heat treatment was performed at 300° C. in a hydrogen atmosphere. During this heat treatment, the defects in the active layer 203 are recovered while the titanium film 219a is oxidized at the same time to give a light-transmitting titanium oxide film 219c. Thus was the pixel electrode 219 completed.

In the present example, the titanium film 219a alone is oxidized during heating without oxidizing silicon, because the titanium film 219a having an oxidation potential lower than that of silicon and indium oxide, i.e., the principal component of the ITO film 219b, is formed on the interface of the drain region 211. Accordingly, it becomes possible to prevent contact resistance between the silicon and the titanium oxide film 219c from increasing during heating. This enables performing the hydrogenation treatment at high temperatures, and hence enables ameliorating the electric characteristics of the pixel TFT, particularly, the off current characteristics.

Moreover, because the titanium film 209a is formed at a thickness of several tens of angstroms, as shown in FIG. 8, the transmittance of the pixel electrode 219 can be provided well comparable to that of a single-layered ITO film by oxidizing the titanium film 219a to yield a titanium oxide film 219c.

Example 3

Top-gate type structured thin film transistors were referred in Examples 1 and 2 above, but the present example shows a fabrication process for a bottom-gate thin film transistor whose gate electrode is located closer to the substrate than the active layer is.

FIGS. 9 (A) to 9 (D) are cross sectional views showing each step in the fabrication process.

Referring to FIG. 9 (A), a silicon oxide film 302 was formed by a sputtering method as a base film on a glass substrate 301. An aluminum film was formed thereafter, and was patterned to form a gate electrode 303.

By incorporating scandium at a concentration of 0.18% by weight into the aluminum film while reducing the concentration of other impurities to a level as low as possible, protrusions known as hillocks or whiskers, which are formed due to abnormal growth of aluminum, can be prevented from forming in the subsequent process steps.

A 500 Å thick silicon oxide film was formed thereafter by means of plasma CVD to provide a gate insulating film 304.

An amorphous silicon film (which is converted later into a crystalline silicon film 305) was formed thereafter by means of plasma CVD to provide a starting film which constitute the active layer of the thin film transistor. A reduced pressure thermal CVD may be employed in place of plasma CVD.

Although not shown in the figure, the amorphous silicon film was crystallized by irradiating a laser radiation. Thus was obtained a crystalline silicon film 305. The state shown in FIG. 9 (A) was realized in this manner.

The structure shown in FIG. 9 (A) was subjected to patterning to form an active layer 306 shown in FIG. 9 (B).

Then, after forming a silicon nitride film not shown in the figure, a mask pattern 307 comprising a silicon nitride film was formed by exposing from the back side of the substrate 301 using the gate electrode 303.

The mask pattern 307 was formed in the following manner.

First, a resist mask pattern was formed by exposing from the back side of the substrate 301 using the pattern of the gate electrode 303. Ashing was performed thereafter to retreat the resist mask pattern. By patterning the silicon nitride film by using the thus retreated resist mask pattern (not shown), a pattern 307 was obtained. The state shown in FIG. 9 (B) was realized in this manner.

Doping of impurities was effected thereafter by using the mask pattern 307. Plasma doping was employed as the doping method, and phosphorus (P) was used as the dopant.

Thus, regions 308 and 309 were doped with phosphorus in this step. No phosphorus was doped into the region 310.

After finishing doping, laser radiation was irradiated from the top side to activate the doping region and to anneal the damage caused by the impact of dopant ions.

Referring to FIG. 9 (C), a source region 308 and a drain region 309 were formed in this manner. A channel region 310 was also established.

As a first interlayer insulating film 311 comprising silicon nitride, a 3,000 Å thick silicon nitride film was formed by means of plasma CVD.

As a film for use as the first interlayer insulating film other than silicon nitride film, a silicon oxide film, a silicon oxynitride film, or a layered film (the layer order is not limited) of silicon oxide film and silicon nitride film can also be used.

Next, an upper layer wiring/electrode 313 in contact with the source region 308 was formed by forming contact holes 312 in the first interlayer insulating film 311 for the source region 308 and the drain region 309. Thus was realized a state shown in FIG. 9 (C).

Subsequently, referring to FIG. 9 (D), a second interlayer insulating film 314 having a plane surface was formed by using a transparent polyimide resin or acrylic resin by means of, for instance, spin coating.

Next, an opening portion connected to the contact hole 312 was formed by etching in the second interlayer insulating film 314, and thus a contact hole reaching the drain region 309 was obtained. Then, as shown in FIG. 9 (D), a pixel electrode 315 was formed in the contact hole for the drain region 309.

To form the pixel electrode 315, a titanium film 315a was formed at first by means of sputtering at a thickness of several tens to 100 Å, for example, at a thickness of 50 Å in this example, and thereafter an ITO film 315b was formed at a thickness of 1,200 Å. The titanium film 315a and the ITO film 315b were patterned, respectively, to the same shape of the pixel electrode 13 shown in FIG. 1. It should be noted that the titanium film 315a and the ITO film 315b are preferably formed sequentially by a continuous process.

Finally, heat treatment was performed at 300° C. in a hydrogen atmosphere. During this heat treatment, the defects in the active layer 305 are removed while the titanium film 315a is oxidized at the same time to give a light-transmitting titanium oxide film 315c. Thus was the pixel electrode 315 completed.

A thin film transistor as shown in FIG. 9 (D) was finally obtained by the process above.

In the present example, the titanium oxide film 315c for the pixel electrode 315 was formed by oxidizing the titanium film 315a. However, titanium oxide film may be formed directly as was the case in Example 1.

In the display device according to the present invention, a double-layered film comprising a transparent electric conductor was used for the pixel electrode, and a metal oxide layer having an oxidation potential lower than that of silicon was used for the transparent electric conductor for the interface with silicon while using a metal oxide layer having an oxidation potential higher than that of silicon for the upper layer transparent electric conductor. Thus, as a result, a thermally stable structure is obtained because the metal oxide in contact with silicon in the interface between the pixel electrode and the silicon layer has an oxidation potential lower than that of silicon and the second transparent electrically conductive film.

Accordingly, the contact resistance can be prevented from increasing because the interface between silicon and pixel electrode remain without being oxidized during the heat treatment such as the hydrogenation treatment. This enable performing hydrogenation treatment at higher temperatures and hence leads to the amelioration of electric characteristics, particularly, the off-current characteristics, of the pixel TFT. Conclusively, a display device having improved reliability can be realized.

Furthermore, because an opaque pad is unnecessary, the aperture ratio of the pixel remains without being lowered. Moreover, because the double-layer structured pixel electrode according to the present invention can be formed without an additional patterning step, the process steps need not be considerably increased.

While the invention has been described in detail, it should be understood that the present invention is not to be construed as being limited thereto, and that any modifications can be made without departing from the scope of claims.

What is claimed is:

1. An electro-optical device comprising a pixel portion having a thin film transistor using silicon as a semiconductor layer and a pixel electrode connected to the thin film transistor, wherein said pixel electrode comprises a first transparent electrically conductive film electrically connected to said semiconductor layer and a second transparent electrically conductive film disposed on the first transparent electrically conductive film, said first transparent electrically conductive film comprises an oxide layer of a first metal having an oxidation potential lower than that of silicon, and said second transparent electrically conductive film comprises an oxide layer of a second metal having an oxidation potential higher than that of silicon.

2. The device of claim 1, wherein the oxide layer of the first metal comprises titanium oxide, and the oxide layer of the second metal comprises a metal compound containing indium oxide as the principal component thereof.

3. The device of claim 1, wherein a region connected to the first transparent electrically conductive film contains an impurity having a predetermined electric conductivity.

4. An electro-optical device comprising a pixel portion having a thin film transistor using a semiconductor layer comprising silicon and a pixel electrode connected to the thin film transistor, wherein said pixel electrode having a first transparent electrically conductive film electrically connected to said semiconductor layer and a second transparent electrically conductive film placed on the first transparent electrically conductive film, said first transparent electrically conductive film comprises an oxide layer obtained by oxidizing by heat treatment a first metal having an oxidation potential lower than that of silicon, and said second transparent electrically conductive film comprises an oxide layer of a second metal having an oxidation potential higher than that of silicon.

5. An electro-optical device comprising a pixel portion having a thin film transistor using a semiconductor layer comprising silicon and a pixel electrode electrically connected to said thin film transistor, wherein said pixel electrode comprises a titanium oxide film electrically connected to said semiconductor layer and an indium oxide film disposed on the titanium oxide film.

6. The device of claim 5 wherein said indium oxide film includes indium tin oxide.

7. An electro-optical device comprising a pixel portion having a thin film transistor using a semiconductor layer comprising silicon and a pixel electrode connected to said thin film transistor, wherein said pixel electrode comprises a titanium oxide film electrically connected to said semiconductor layer and a metal compound film comprising an indium oxide in contact with said titanium oxide film.

8. The device of claim 7 wherein said indium oxide includes indium tin oxide.

9. An electro-optical device comprising:

a first electrically conductive film comprising an oxide layer of a first metal electrically connected to a semiconductor layer comprising silicon; and a second electrically conductive film comprising an oxide layer of a second metal, wherein said first metal has an oxidation potential lower than that of said second metal.

10. The device of claim 9 wherein said oxide layer of the second metal comprises indium oxide or indium tin oxide.

* * * * *